US009725895B1

(12) United States Patent
Gill et al.

(10) Patent No.: US 9,725,895 B1
(45) Date of Patent: Aug. 8, 2017

(54) RELOCATABLE WIND RESISTANT MODULAR ISO CONTAINER STRUCTURE

(71) Applicants: Peter E. Gill, Tamuning, GU (US); Peter E. Gill, III, Tamuning, GU (US)

(72) Inventors: Peter E. Gill, Tamuning, GU (US); Peter E. Gill, III, Tamuning, GU (US)

(73) Assignee: KWIKSPACE GUAM, INC., Haganta, GU (US)

( * ) Notice: Subject to any disclaimer, the term of this patent is extended or adjusted under 35 U.S.C. 154(b) by 0 days.

(21) Appl. No.: 15/238,783

(22) Filed: Aug. 17, 2016

(51) Int. Cl.
| *E04B 1/343* | (2006.01) |
| *E04B 1/32* | (2006.01) |
| *E04B 1/342* | (2006.01) |
| *E04B 1/348* | (2006.01) |
| *E04B 1/41* | (2006.01) |

(Continued)

(52) U.S. Cl.
CPC ........ *E04B 1/34331* (2013.01); *E04B 1/3205* (2013.01); *E04B 1/342* (2013.01); *E04B 1/34861* (2013.01); *E04B 1/40* (2013.01); *E04B 2/721* (2013.01); *E04B 7/107* (2013.01); *E04D 13/0725* (2013.01); *E04H 9/14* (2013.01);

(Continued)

(58) Field of Classification Search
CPC .. E04B 1/3205; E04B 2001/3276; E04B 1/24; E04B 2001/2415; E04B 1/2608; E04B 1/32; E04B 1/40; E04B 1/34331; E04B 1/342; E04B 1/34861; E04B 1/34315; E04B 1/3483; E04B 7/022; E04B 1/34384; E04B 1/34321; E04H 1/1205; E04H 1/02; E04H 1/12; E04H 2001/1283;
E04H 6/025; E04H 6/44; E04H 9/14; E04H 15/008; E04H 15/34; E04H 15/36; E04H 15/44; E04H 1/005; E04H 1/04; E04D 13/0725
USPC ........... 52/80.2, 270, 90.1, 91.3, 86, 745.05, 52/79.1, 79.2, 79.3, 79.4, 79.5, 79.6, 79.7, 52/79.8, 79.9, 79.11, 79.12, 79.13, 79.14
See application file for complete search history.

(56) References Cited

U.S. PATENT DOCUMENTS

| 2,666,507 A | * | 1/1954 | Ruark | ................... E04B 1/3205 |
| | | | | 52/639 |
| 2,693,195 A | * | 11/1954 | Frieder | ............... E04B 1/34326 |
| | | | | 135/122 |

(Continued)

OTHER PUBLICATIONS

Hydroswing ISO Container Doors Aug. 16, 2014 13:20 by Hydroswing in General, Industrial Doors, ISO Container Doors http://hydroswing-hydraulic-doors.com/blog/?tag=/ISO+container+doors.*

*Primary Examiner* — Robert Canfield
*Assistant Examiner* — Matthew Gitlin
(74) *Attorney, Agent, or Firm* — Donald J. Ersler

(57) ABSTRACT

A relocateable wind resistant modular ISO container structure preferably includes a plurality of ISO containers, two modular end walls and a modular roof. An upper ISO container is secured to a lower ISO container with a plurality of twist lock connectors and a plurality of container bridge fittings to form a plurality of ISO blocks. The modular roof includes a plurality of arch panels and a plurality of arch connectors. The plurality of arch panels are attached to each other with fasteners to form a roof panel. The plurality of arch connectors are attached to opposing ends of the roof panel to form a modular roof. A gutter may be secured to opposing ends of the modular roof. The end wall is retained between the first and second ISO blocks. The end wall is (Continued)

preferably fabricated from a metal corrugated panel or a reinforced metal panel.

19 Claims, 11 Drawing Sheets

(51) Int. Cl.
*E04B 7/10* (2006.01)
*E04D 13/072* (2006.01)
*E04B 2/72* (2006.01)
*E04H 9/14* (2006.01)
*E04H 1/12* (2006.01)

(52) U.S. Cl.
CPC ............... *E04B 2001/3276* (2013.01); *E04H 2001/1283* (2013.01)

(56) References Cited

U.S. PATENT DOCUMENTS

| | | | | |
|---|---|---|---|---|
| 3,218,773 | A * | 11/1965 | Heirich | E04C 2/322 52/262 |
| 3,295,267 | A * | 1/1967 | Lundell | E04B 1/24 52/222 |
| 3,619,432 | A | 11/1971 | Harrington | |
| 3,968,604 | A * | 7/1976 | Hills | E04B 1/3205 52/745.07 |
| 5,233,799 | A * | 8/1993 | Abukawa | B21D 5/08 52/53 |
| 5,245,802 | A * | 9/1993 | Davis | E04B 1/34315 135/97 |
| 5,385,423 | A * | 1/1995 | Abukawa | B21D 5/08 403/186 |
| 5,469,674 | A * | 11/1995 | Morello | B21D 13/04 52/220.2 |
| 5,735,639 | A * | 4/1998 | Payne | B65D 88/121 206/386 |
| 6,131,343 | A * | 10/2000 | Jackson, Jr. | E04H 9/14 52/169.6 |
| 6,615,550 | B2 * | 9/2003 | Reuschel | E04B 2/7433 135/121 |
| 6,862,847 | B2 * | 3/2005 | Bigelow | E04B 1/34321 220/1.5 |
| 7,614,189 | B2 * | 11/2009 | Smerud | E06B 1/006 52/210 |
| 7,647,737 | B2 * | 1/2010 | Morello | E04B 1/3205 52/245 |
| 7,984,592 | B1 * | 7/2011 | Jiras | A01F 25/163 52/192 |
| 8,001,730 | B2 * | 8/2011 | Wallance | E04B 1/003 52/79.1 |
| 8,082,700 | B2 * | 12/2011 | Kennedy | E04B 1/3205 135/124 |
| 8,240,495 | B2 * | 8/2012 | Ronci | B65D 90/008 220/1.5 |
| 8,333,039 | B2 * | 12/2012 | Hsu | E04B 1/3483 52/236.3 |
| 8,393,127 | B1 * | 3/2013 | Jensen | E04H 3/02 52/127.1 |
| 8,418,424 | B2 * | 4/2013 | Davis | E04B 1/3205 52/537 |
| 8,726,605 | B2 * | 5/2014 | Davis | E04B 1/3205 52/537 |
| 8,850,750 | B2 * | 10/2014 | Dagher | E02D 29/05 52/86 |
| 8,888,165 | B2 * | 11/2014 | Roush | B60P 7/02 296/185.1 |
| 9,051,725 | B2 * | 6/2015 | Farmer | E04B 1/34357 |
| 9,109,376 | B2 * | 8/2015 | Prodaniuk | E04H 1/12 |
| 9,212,499 | B1 * | 12/2015 | Maurer | E04H 5/04 |
| 9,371,641 | B2 * | 6/2016 | Christensen | E04B 1/3205 |
| 9,551,143 | B2 * | 1/2017 | Saez Blaya | E04H 1/005 |
| 2001/0023561 | A1 * | 9/2001 | Henbid | E04H 15/18 52/222 |
| 2006/0207193 | A1 * | 9/2006 | Lilke | E04B 1/3483 52/79.7 |
| 2008/0110105 | A1 * | 5/2008 | Boschma | E04B 1/342 52/80.2 |
| 2009/0307994 | A1 * | 12/2009 | Cathcart | E04B 1/3483 52/79.9 |
| 2010/0146789 | A1 * | 6/2010 | Anderson | B21D 5/14 29/897.32 |
| 2011/0023404 | A1 * | 2/2011 | Gulati | F17C 1/00 52/582.1 |
| 2011/0232196 | A1 * | 9/2011 | Robinson | E06B 3/38 49/199 |
| 2015/0275502 | A1 * | 10/2015 | Guo | E04B 1/3205 52/86 |
| 2017/0081867 | A1 * | 3/2017 | Wasson | E04B 1/342 |

* cited by examiner

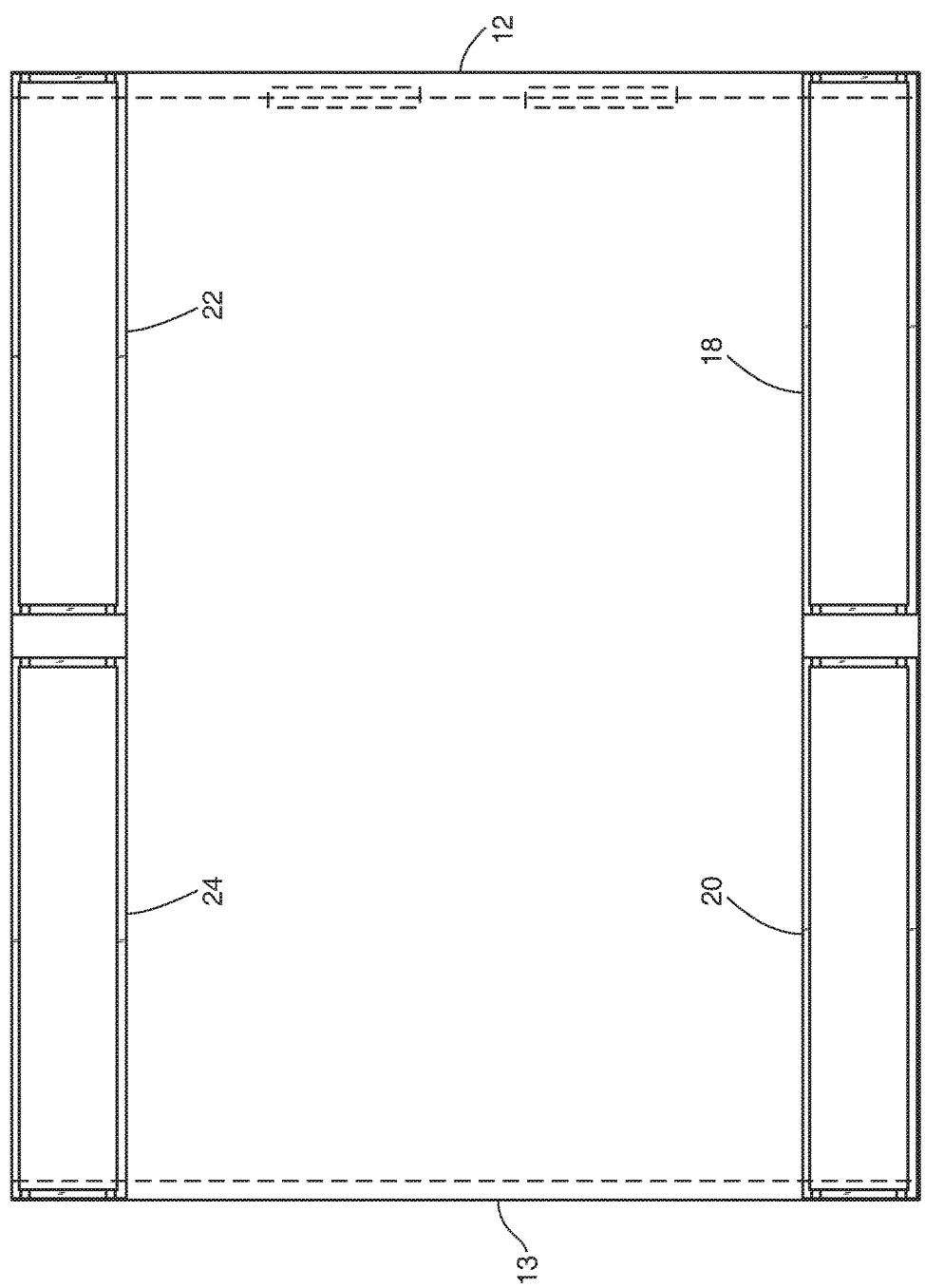

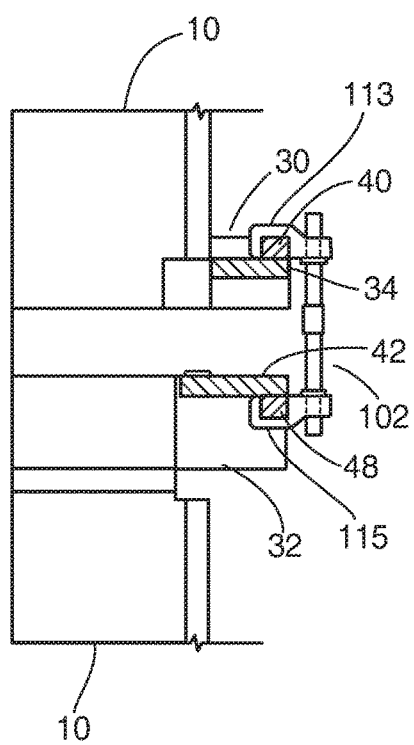
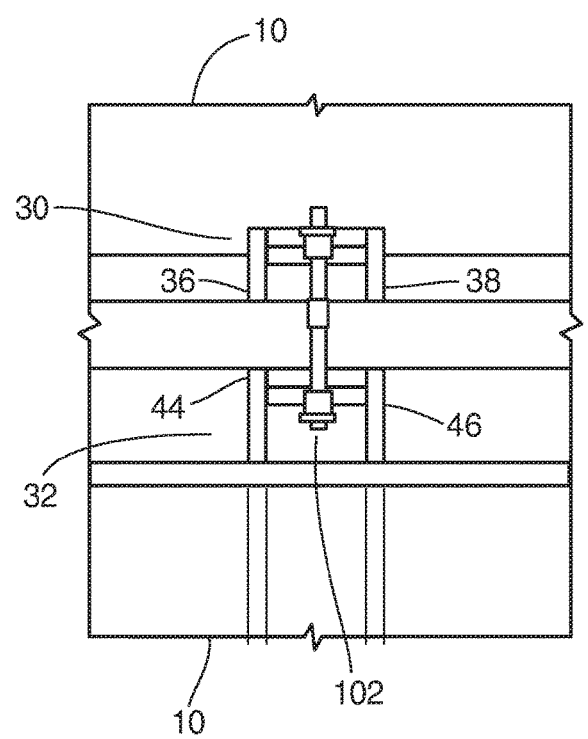
FIG. 5
FIG. 6

RELOCATABLE WIND RESISTANT MODULAR ISO CONTAINER STRUCTURE

BACKGROUND OF THE INVENTION

1. Field of the Invention

The present invention relates generally to relocateable temporary structures and more specifically to a relocatable wind resistant modular ISO container structure, which allows a building to be constructed from a plurality of ISO containers, a modular roof and modular end walls.

2. Discussion of the Prior Art

U.S. Pat. No. 3,619,432 to Harrington discloses a method and apparatus for construction of concrete shells. Patent publication no. 2008/0110105 to Boschma et al. discloses a system and method for establishing a protected work and storage space. However, it appears that none of the ISO container structures may endure typhoon wind speeds of up to 210 mph; and may be assembled and disassembled in a matter of weeks.

Accordingly, there is a clearly felt need in the art for a relocateable wind resistant modular ISO container structure, which allows a building to be constructed from a plurality of ISO containers, a modular roof and modular end walls; which may endure typhoon wind speeds of up to 210 mph; and which may be assembled and disassembled in a matter of weeks.

SUMMARY OF THE INVENTION

The present invention provides a relocateable wind resistant modular ISO container structure, which may be assembled and disassembled in a matter of weeks. A relocateable wind resistant modular ISO container structure (ISO container structure) preferably includes a plurality of ISO containers, two modular end walls and a modular roof. An upper ISO container is secured to a lower ISO container with a plurality of twist lock connectors and a plurality of container bridge fittings to form a first front ISO block, a first rear ISO block, a second front ISO block and a second rear ISO block. A side wall may be retained between the front ISO block and the rear ISO block. The side wall is preferably fabricated from a metal corrugated panel or a reinforced metal panel. The side wall includes a bottom flange, a top flange, a first side flange and a second side flange. A plurality of fastener holes are formed through the top flange for attachment of the arch connector with a plurality of fasteners. A plurality of fastener holes are formed through the first side flange and second side flange for attachment of the front and rear ISO blocks with a plurality of fasteners. A door and/or window may be formed in the side wall.

The modular roof includes a plurality of arch panels and a plurality of arch connectors. The arch panel includes a base member, a first angled side member, a second angled side member, a first flange, a second flange, a first overlap flange and a second overlap flange. The arch panel also includes a curved or arched length. The first angled side member extends upward from a first side of the base member and the second angled side member extends upward from a second side of the base member. The first flange extends outward from a distal edge of the first angled side member and the second flange extends outward from a distal edge of the second angled side member. The first overlap flange extends outward and downward from a distal edge of the first flange and the second overlap flange extends outward and downward from a distal edge of the second flange.

A first capture channel is formed on an inside surface of the first angled side member, the first flange and the first overlap flange. The first capture channel is sized to receive an adjacent arch panel. A second capture channel is formed on an inside surface of the second angled side member, the second flange and the second overlap flange. The second capture channel is sized to receive an adjacent arch panel. A plurality of side fastener holes are formed through the first and second flanges to attach side adjacent arch panels to each other with a plurality of fasteners. Two sets of end fastener holes are formed through the base member, the first angled side member and the second angled side member at each end thereof. Two end adjacent arch panels are overlapped and attached to each other with a plurality of fasteners inserted through the two sets of end fastener holes.

A gutter may be secured to opposing ends of the modular roof. The gutter preferably includes a modular roof flange, a gutter channel and a plurality of gutter hangers. The modular roof flange extends outward from one edge of the gutter channel. A retention lip is formed on an opposing edge of the gutter channel. Each gutter hanger includes a lengthwise plate and a hooked end formed on an end of the lengthwise plate. An inside surface of the hooked end is sized to receive the retention lip. An end opposite the retention lip is retained between a bottom of the arch panels and a top of the modular roof flange.

The arch connector includes a base plate, a panel receiver and a plurality of gussets. The panel receiver includes a plurality of panel pockets. Each panel pocket includes a base receiver member, a first angled receiver side member, a second angled receiver side member and a receiver flange member. The first angled receiver side member extends upward from a first side of the base receiver member and the second angled receiver side member extends upward from a second side of the base receiver member. A plurality of receiver fastener holes are formed through the base receiver member, the first angled receiver side member, the second angled receiver side member and the receiver flange. The panel pocket is sized to receive a cross section of the arch panel. A plurality of fasteners are used to secure the plurality of arch panels to the arch connector. The plurality of gussets are welded between a top of the base plate and a bottom of the panel receiver. The plurality of gussets are used to orient the panel receiver at a specific angle to receive the plurality of arch panels. A plurality of container holes are formed through the base plate to attach the arch connector to a top of an ISO container with a plurality of fasteners.

An end wall is retained between the first and second ISO blocks. The end wall is preferably fabricated from a metal corrugated panel or a reinforced metal panel. The end wall includes a bottom flange, a first container bottom flange, a second container bottom flange, a top flange, a first side flange and a second side flange. A plurality of fastener holes are formed through the top flange for attachment of the modular roof with a plurality of fasteners. A plurality of fastener holes are formed through the first side flange and second side flange for attachment of the first front and second front ISO blocks with a plurality of fasteners. A plurality of fastener holes are formed through the first container bottom flange for attachment of the first front ISO block with a plurality of fasteners. A plurality of fastener holes are formed through the second container bottom flange for attachment of the second front ISO block with a plurality of fasteners. A retracting door, door and/or window may be formed in the end wall.

Support bars and conduit may be suspended from the modular roof with a plurality of nut couplers and a plurality of threaded rods. The nut couplers are threaded on to the distal ends of the plurality of fasteners, which secure adjacent arch panels to each other. The plurality of threaded rods are threaded into the plurality of nut couplers. A plurality of holes are formed through a plurality of channels or angles to receive the plurality of threaded rods. A plurality of conduit hangers are used to support a conduit.

Accordingly, it is an object of the present invention to provide an ISO container structure, which allows a building to be constructed from a plurality of ISO containers, a modular roof and modular end walls.

It is a further object of the present invention to provide an ISO container structure, which may endure typhoon wind speeds up to 210 mph.

Finally, it is an object of the present invention to provide an ISO container structure, which may be assembled and disassembled in a matter of weeks.

These and additional objects, advantages, features and benefits of the present invention will become apparent from the following specification.

BRIEF DESCRIPTION OF THE DRAWINGS

FIG. 3 is a top view of an ISO container structure with two retracting doors located in a front end wall in accordance with the present invention.

FIG. 5 is a side view of an upper attachment bracket attached to an upper ISO container; a lower attachment bracket attached to a lower ISO container; and a container bridge fitting engaging the upper and lower attachment brackets to secure the upper and lower ISO containers to each other of an ISO container structure in accordance with the present invention.

FIG. 6 is a front view of an upper attachment bracket attached to an upper ISO container; a lower attachment bracket attached to a lower ISO container; and a container bridge fitting engaging the upper and lower attachment brackets to secure the upper and lower ISO containers to each other of an ISO container structure in accordance with the present invention.

DETAILED DESCRIPTION OF THE PREFERRED EMBODIMENTS

Figure 1:
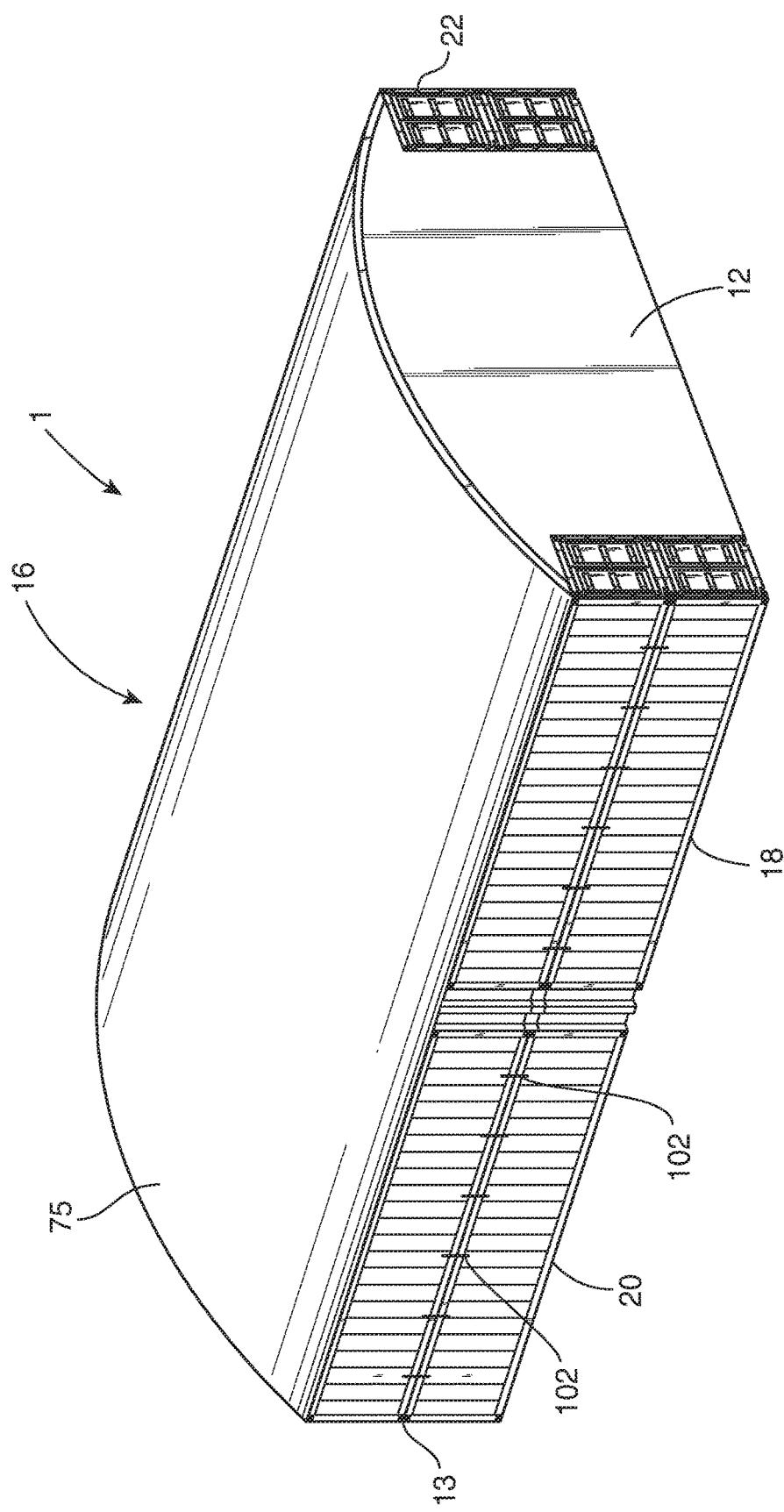
FIG. 1 is a perspective view of an ISO container structure in accordance with the present invention.

With reference now to the drawings, and particularly to FIG. 1, there is shown a perspective view of an ISO container structure 1. The ISO container structure 1 preferably includes a plurality of ISO containers 10, a first end wall 12, a second end wall 13, a second end wall 14 and a modular roof 16. With reference to FIGS. 3-6, an upper ISO container 10 is secured to a lower ISO container 10 with a plurality of twist lock connectors 100 and a plurality of container bridge fittings 102 to form a first front ISO block 18, a first rear ISO block 20, a second front ISO block 22 and a second rear ISO block 24. The plurality of twist lock connectors 100 are inserted into bottom openings in eight castings 26 retained in the upper ISO container 10 and top openings in eight castings 28 in a top of the lower ISO container 10. The twist lock connector 100 includes an upper retention projection 104, a lower retention projection 106 and a lock handle 108. Rotating the lock handle 108 causes the upper and lower retention projections 104, 106 to engage upper and lower castings 26, 28 of the upper and lower ISO containers 10. Twist lock connectors 100 are well known in the art, need not be explained in further detail and may be purchased from any one of numerous suppliers.

With reference to FIGS. 5-6, an upper attachment bracket 30 is attached to the upper ISO container 10 and a lower attachment bracket 32 is attached to a lower ISO container 10. The upper attachment bracket 30 includes a base plate 34, a first side member 36, a second side member 38 and a lower ridge rod 40. The first side member 36 is attached to a first end of the base plate 34 and the second side member 38 is attached to a second end of the base plate 34. The upper ridge rod 40 is attached to a top and front of the base plate 34. The base plate 34, the first side member 36 and second side member 36 are attached to the upper ISO container 10 at a bottom edge thereof.

The lower attachment bracket 32 includes a base plate 42, a first side member 44, a second side member 46 and a lower ridge rod 48. The first side member 44 is attached to a first end of the base plate 42 and the second side member 46 is attached to a second end of the base plate 42. The lower ridge rod 48 is attached to a bottom and front of the base plate 42. The base plate 42, the first side member 44 and second side member 46 are attached to the lower ISO container 10 at a top edge thereof. A container bridge fitting 102 includes an adjustment stud 111, an upper clamp jaw 113 and a lower clamp jaw 115. The adjustment stud 111 is threadably engaged with the upper clamp jaw 113 and the lower clamp jaw 115. The upper clamp jaw 113 is engaged with the upper ridge rod 40 and the lower clamp jaw 115 is engaged with the lower ridge rod 48. Rotation of the adjustment stud 111 draws the upper ISO container 10 toward the lower ISO container 10. Container bridge fittings 102 are well known in the art and need not be explained in further detail. The plurality of upper and lower attachment brackets 30, 32 are attached to the upper and lower ISO containers 10 between the twist lock connectors 100.

Figure 5A:
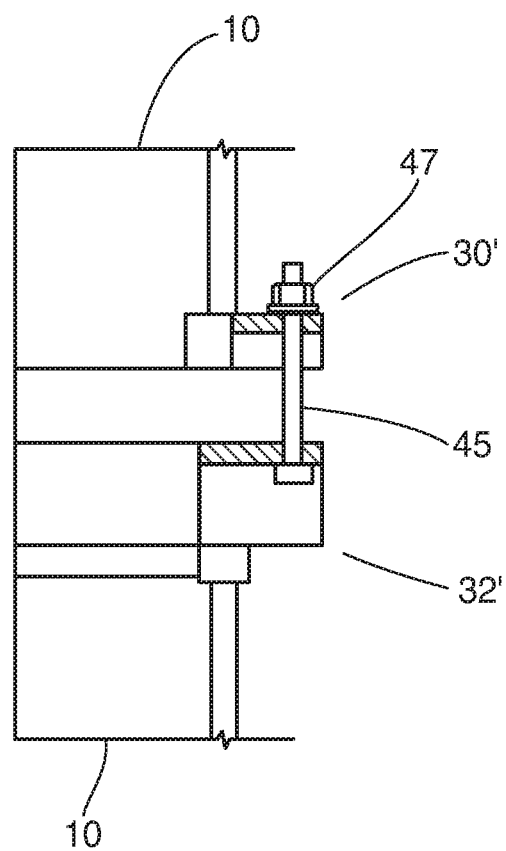
FIG. 5a is a side view of an alternative upper attachment bracket attached to an upper ISO container; an alternative lower attachment bracket attached to a lower ISO container; and a fastener with a nut used to secure the upper and lower ISO containers to each other of an ISO container structure in accordance with the present invention.

With reference to FIG. 5a, an alternative upper bracket 30' is attached to the upper ISO container 10; an alternative lower bracket 32' is attached to the lower ISO container 10; and a threaded fastener 45 with a nut 47 are used to draw the alternative upper and lower brackets 30', 32' toward each other instead of the container bridge fitting 102. The upper ridge rod 40 is removed from the upper bracket 30 to create the alternative upper bracket 30' and an upper hole is formed through the base plate 34 to receive the threaded fastener 45. The lower ridge rod 48 is removed from the lower bracket 32 to create the alternative lower bracket 32' and a lower hole is formed through the base plate 34 to receive the threaded fastener 45. However, other methods of drawing the upper ISO container 10 toward the lower ISO container 10 may also be used.

Figure 2:
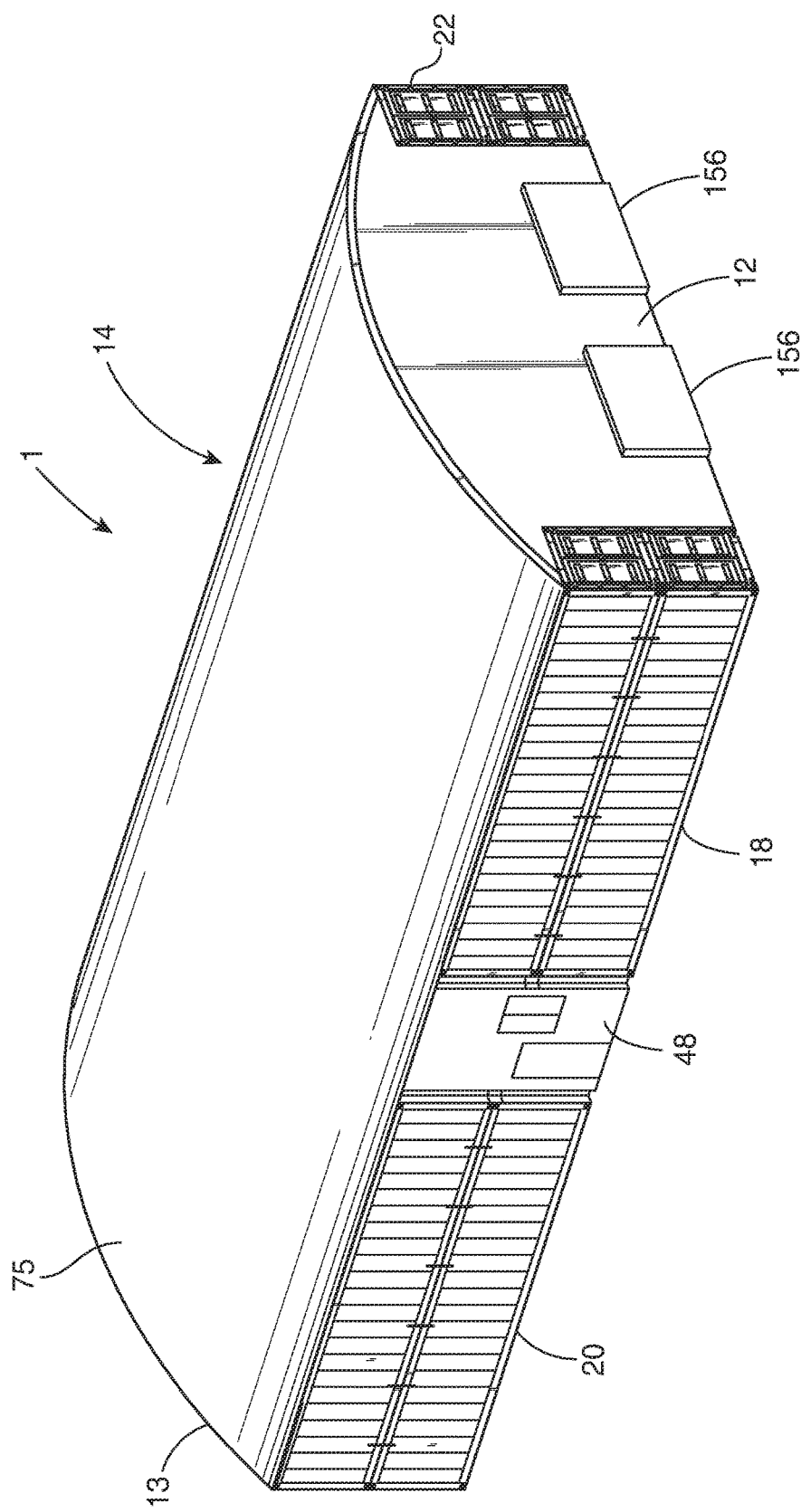
FIG. 2 is a perspective view of an ISO container structure with a side wall retained between a front ISO block and a rear ISO block, and two retracting doors located in a front end wall in accordance with the present invention.
Figure 2A:
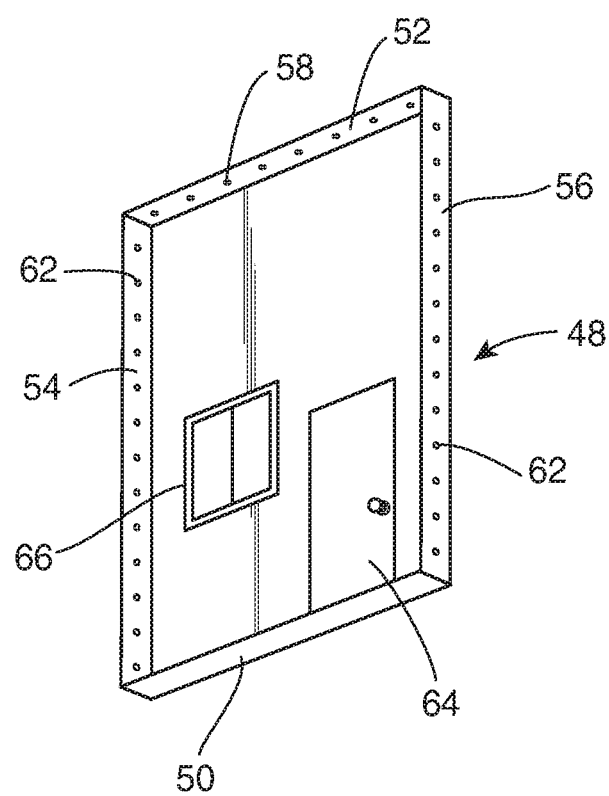
FIG. 2a is a rear view of a side wall of an ISO container structure in accordance with the present invention.
Figure 4:
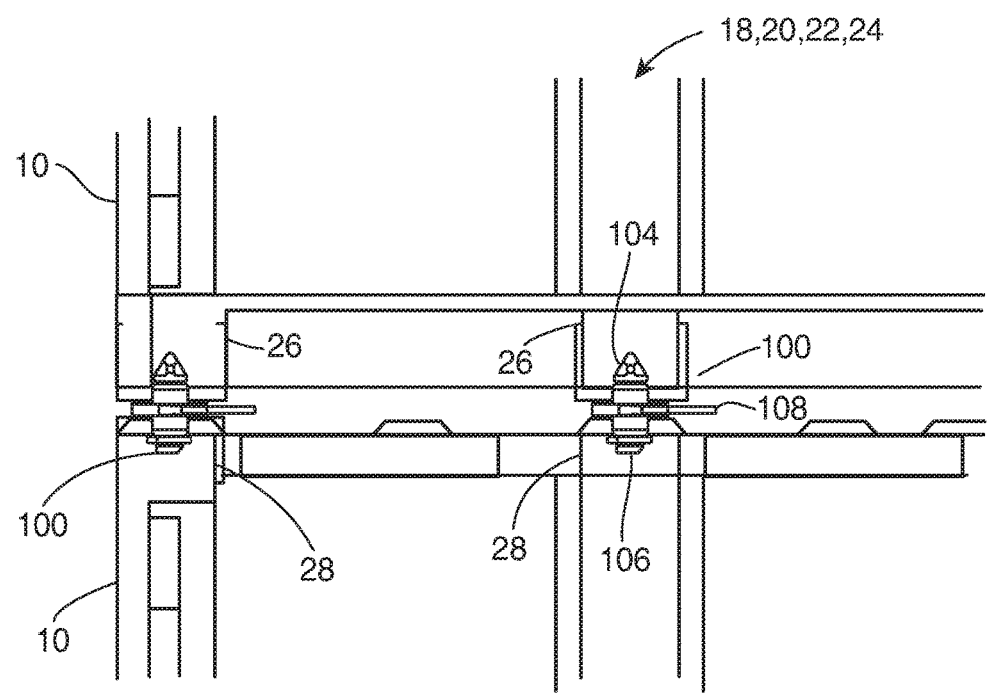
FIG. 4 is an enlarged side view of an upper ISO container secured to a lower ISO container with two twist lock devices of an ISO container structure in accordance with the present invention.
Figure 11:
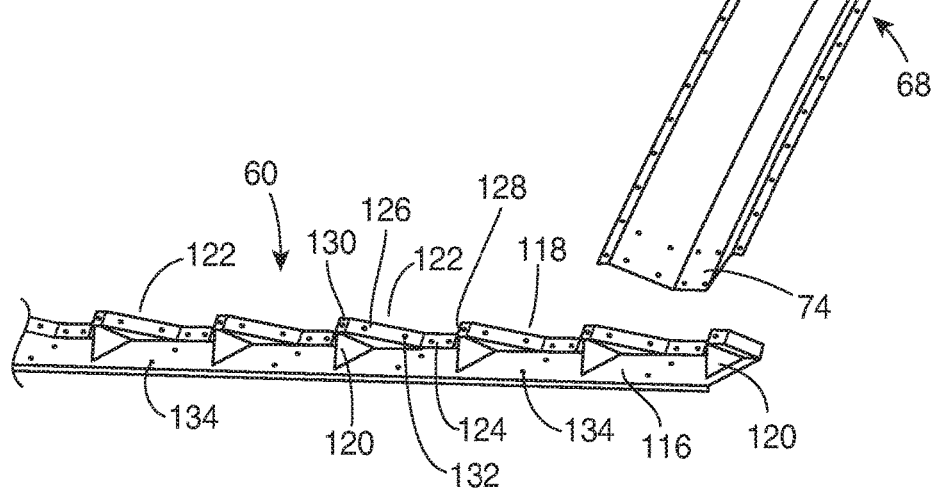
FIG. 11 is an exploded perspective view of an arch panel and arch connector of a modular roof of an ISO container structure in accordance with the present invention.

With reference to FIG. 2, a side wall 48 may be retained between a front ISO block 18 and a rear ISO block 20. The side wall 48 is preferably fabricated from a metal corrugated panel or a reinforced metal panel. With reference to FIG. 2a, the side wall 48 includes a bottom flange 50, a top flange 52, a first side flange 54 and a second side flange 56. With reference to FIG. 11, a plurality of fastener holes 58 are formed through the top flange 52 for attachment of an arch connector 60 with a plurality of fasteners. A plurality of fastener holes 62 are formed through the first side flange 54 and second side flange 56 for attachment of the front and rear ISO blocks 18, 20, 22, 24 with a plurality of fasteners. A door 64 and/or window 66 may be formed in the side wall 48.

Figure 7:
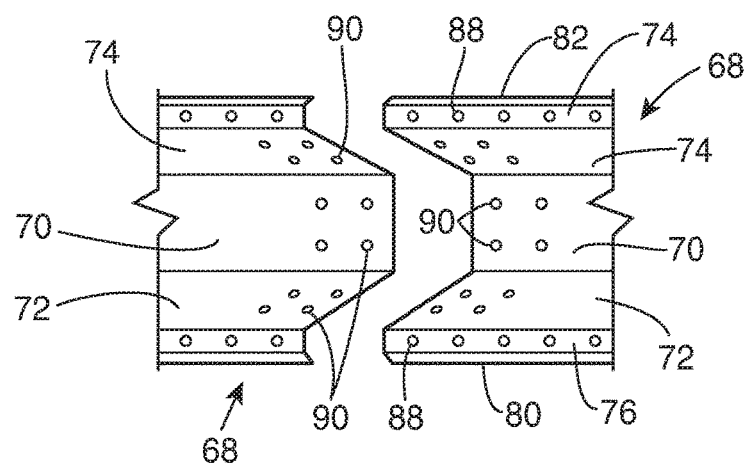
FIG. 7 is a top view of a portion of a first arch panel adjacent to a portion of a second arch panel of a modular roof of an ISO container structure in accordance with the present invention.
Figure 8:
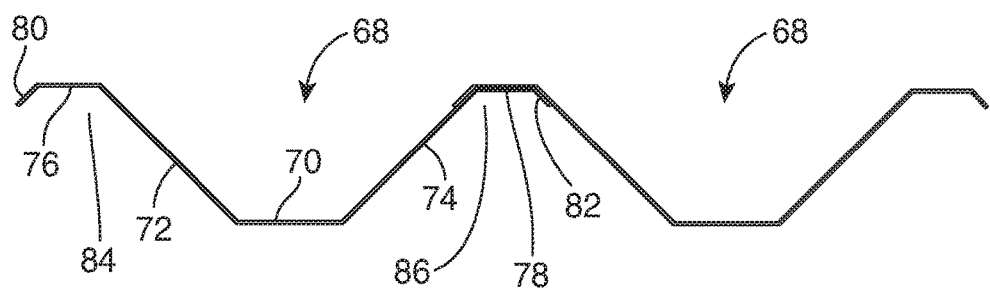
FIG. 8 is an end view of a first arch panel attached to a second arch panel, before securement with a plurality of fasteners of a modular roof of an ISO container structure in accordance with the present invention.

With reference to FIGS. 7-8 and 11, the modular roof 16 includes a plurality of arch panels 68 and the plurality of arch connectors 60. The arch panel 68 includes a base member 70, a first angled side member 72, a second angled side member 74, a first flange 76, a second flange 78, a first overlap flange 80 and a second overlap flange 82. The arch panel 68 also includes a curved or arched length. The first angled side member 72 extends upward from a first side of the base member 70 and the second angled side member 74 extends upward from a second side of the base member 70. The first flange 76 extends outward from a distal edge of the first angled side member 72 and the second flange 78 extends outward from a distal edge of the second angled side member 74. The first overlap flange 80 extends outward and downward from a distal edge of the first flange 76 and the second overlap flange 82 extends outward and downward from a distal edge of the second flange 78.

A first capture channel 84 is formed on an inside surface of the first angled side member 72, the first flange 76 and the first overlap flange 80. The first capture channel 84 is sized to receive the second angled side member 74, the second flange 78 and the second overlap flange 80 of an adjacent arch panel 68. A second capture channel 86 is formed on an inside surface of the second angled side member 74, the second flange 78 and the second overlap flange 82. The second capture channel 86 is sized to receive first angled side member 72, the first flange 76 and the first overlap flange 80 of an adjacent arch panel 68. A plurality of side fastener holes 88 are formed through the first and second flanges 76, 78 to attach side adjacent arch panels 68 to each other with a plurality of fasteners. Two sets of end fastener holes 90 are formed through the base member 70, the first angled side member 72 and the second angled side member 74 at each end thereof. Two end adjacent arch panels 68 are overlapped and attached to each other with a plurality of fasteners inserted through the two sets of end fastener holes 90.

Figure 10:
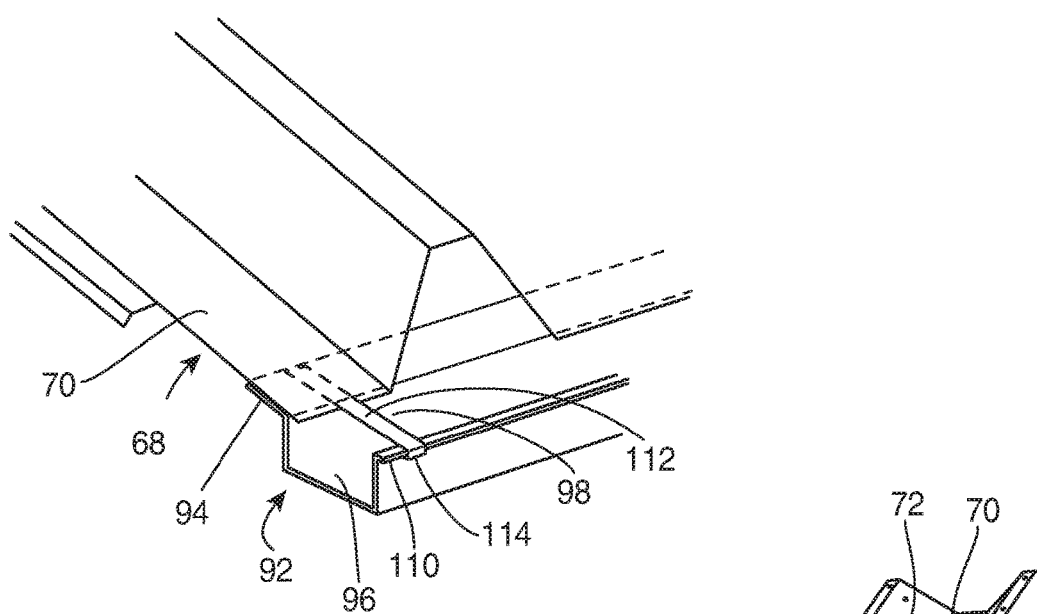
FIG. 10 is a perspective view of a gutter attached to an end of an arch panel of fasteners of a modular roof of an ISO container structure in accordance with the present invention.

With reference to FIG. 10, a gutter 92 may be secured to opposing ends of the modular roof 68. The gutter 92 preferably includes a modular roof flange 94, a gutter channel 96 and a plurality of gutter hangers 98. The modular roof flange 94 extends outward from one edge of the gutter channel 96. A retention lip 110 is formed on an opposing edge of the gutter channel 96. Each gutter hanger 98 includes a lengthwise plate 112 and a hooked end 114 formed on an end of the lengthwise plate 112. An inside surface of the hooked end 114 is sized to receive the retention lip 110. An end opposite the retention lip 110 is retained between a bottom of the arch panels 68 and a top of the modular roof flange 94.

With reference to FIG. 11, the arch connector 60 includes a base plate 116, a panel receiver 118 and a plurality of gussets 120. The panel receiver 118 includes a plurality of panel pockets 122. Each panel pocket 122 includes a base receiver 124 member, a first angled receiver side member 126, a second angled receiver side member 128 and a receiver flange member 130. The first angled receiver side member 126 extends upward from a first end of the base receiver member 124 and the second angled receiver side member 128 extends upward from a second end of the base receiver member 124. The receiver flange member 130 extends from a distal end of the first angled receiver side member 126. A plurality of receiver fastener holes 132 are formed through the base receiver member 124, the first angled receiver side member 126, the second angled receiver side member 128 and the receiver flange 130. The panel pocket 122 is sized to receive a cross section of the arch panel 68. A plurality of fasteners are used to secure the plurality of arch panels 68 to the arch connector 60. The plurality of gussets 120 are welded between a top of the base plate 116 and a bottom of the panel receiver 118. The plurality of gussets 120 are used to orient the panel receiver 118 at a specific angle to receive the plurality of arch panels 68. A plurality of container holes 134 are formed through the base plate 116 to attach the arch connector 60 to a top of the upper ISO containers 10 with a plurality of fasteners. The plurality of arch panels 68 are removably attached to each other with the plurality of fasteners to form a modular roof panel 75. The plurality of arch connectors 60 are attached to opposing ends of the modular roof panel 75 to form the modular roof 16.

Figure 1A:
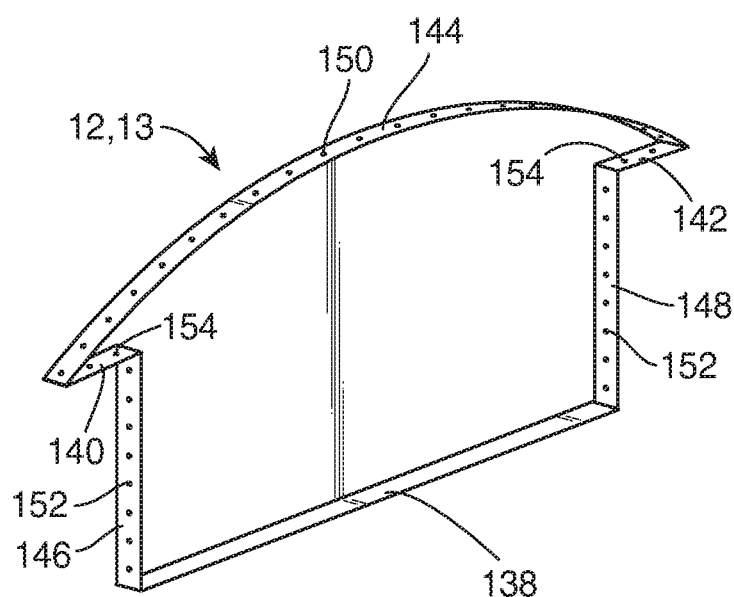
FIG. 1a is a rear view of a rear end wall of an ISO container structure in accordance with the present invention.

With reference to FIG. 1a, an end wall 136 is retained between the first and second ISO blocks 18, 22 and 20, 24. The end wall 12, 13 are preferably fabricated from a metal corrugated panel or a reinforced metal panel. The end wall 12, 13 includes a wall member 136, a bottom flange 138, a first container bottom flange 140, a second container bottom flange 142, a top flange 144, a first side flange 146 and a second side flange 148. A plurality of fastener holes 150 are formed through the top flange 144 for attachment of the arch connector 60 with a plurality of fasteners. A plurality of fastener holes 152 are formed through the first side flange 146 and the second side flange 148 for attachment of the first and second ISO blocks 18, 22, 20, 24 with a plurality of fasteners. A plurality of fastener holes 154 are formed through the first container bottom flange 140 for attachment of the first ISO blocks 18, 20 with a plurality of fasteners. A plurality of fastener holes 154 are formed through the second container bottom flange 142 for attachment of the second ISO blocks 22, 24 with a plurality of fasteners. A retracting door 156, door 64 and/or window 66 may be formed in the end wall 136.

Figure 9:
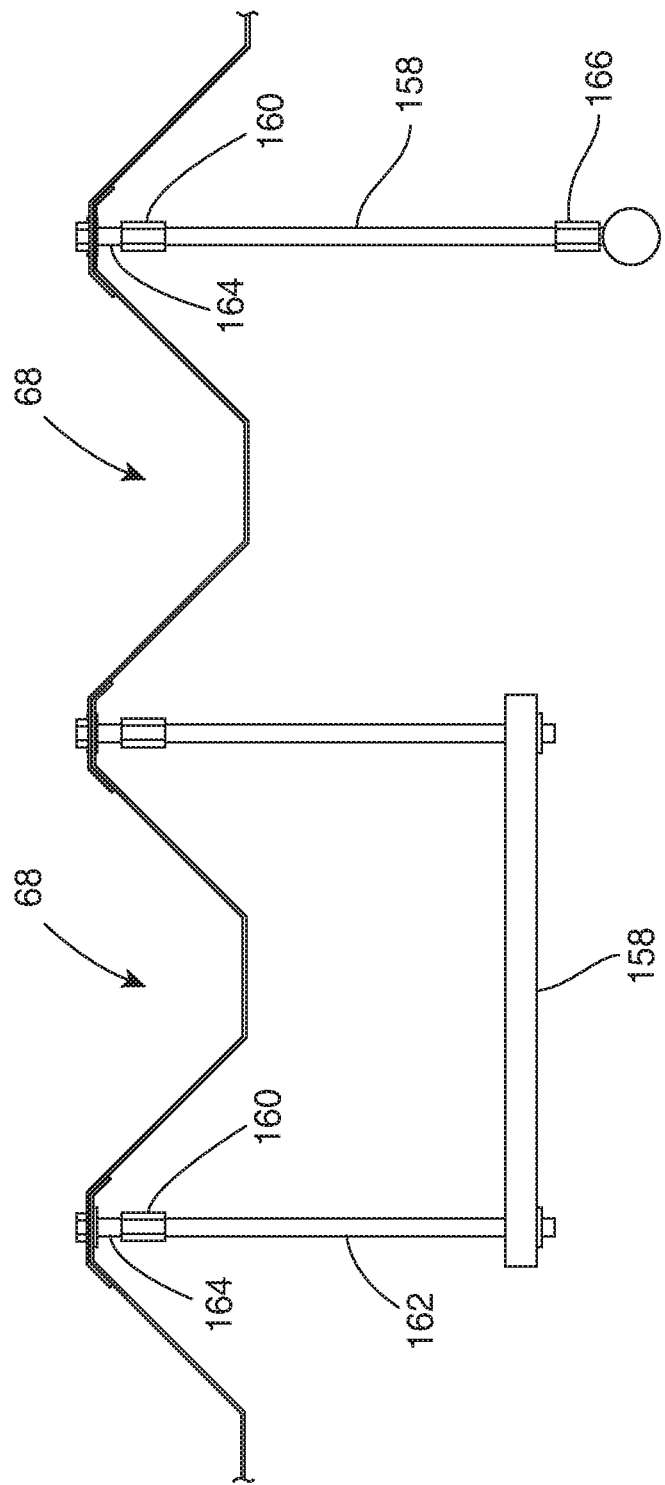
FIG. 9 is an end view of a first arch panel attached to a second arch panel; a second arch panel attached to a third arch panel with a plurality of fasteners; a channel or angle suspended from the plurality of fasteners with two nut couplers and threaded rods; and a conduit hanger suspended from a fastener with a nut coupler and a threaded rod of a modular roof of an ISO container structure in accordance with the present invention.

With reference to FIG. 9, support bars 158 and conduit may be suspended from the modular roof 16 with a plurality of nut couplers 160 and a plurality of threaded rods 162. The nut couplers 160 are threaded on to the distal ends of a plurality of fasteners 164, which secure adjacent arch panels 68 to each other. The plurality of threaded rods 162 are threaded into the plurality of nut couplers 160. A plurality of holes are formed through the support bar 158, which could be a channel or angle to receive the plurality of threaded rods 162. A plurality of conduit hangers 166 are used to support a conduit or pipe. Conduit hangers are well known in the art and need not be explained in detail. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An ISO container structure comprising:
   at least one first ISO container block and at least one second ISO container block, each said ISO container block includes a lower ISO container and an upper ISO container secured to said lower ISO container; and
   a modular roof includes a plurality of arch panels and a plurality of arch connectors, each one of said plurality of arch panels includes a first panel side, a second panel side, a first panel end and a second panel end, said panel sides and said panel ends of said plurality of arch panels are removably attached to each other to form a modular roof panel, each one of said plurality of arch panels includes a base member, a first angled side member, a second angled side member, a first flange and a second flange, said first angled side member extends upward from a first side of said base member, said second angled side member extends upward from a second side of said base member, said first flange extends outward from a distal edge of said first angled side member, said second flange extends outward from a distal edge of said second angled side member, a first overlap flange extends downward from said distal edge of said first flange, a second overlap flange extends downward from said distal edge of said second flange, each one of said plurality of arch connectors includes a plurality of panel pockets, each one of said plurality of panel pockets is sized to receive a cross section of one of said plurality of arch panels, each end of said modular roof panel is removably attached to said plurality of arch connectors, said plurality of arch connectors are attached to a top of said upper ISO container block.

2. The ISO container structure of claim 1, further comprising:
   a plurality of twist lock connectors are used to removably secure said upper ISO container to said lower ISO container.

3. The ISO container structure of claim 1, further comprising:
   a plurality of upper attachment brackets are attached to said upper ISO container, a plurality of lower attachment brackets are attached to said lower ISO container, wherein one of a plurality of container bridge fittings and a plurality of fasteners are used to draw said upper attachment bracket toward said lower attachment bracket.

4. The ISO container structure of claim 1 wherein:
   each one of said plurality of arch connectors includes a base plate, a panel receiver and a plurality of gussets, said plurality of gussets are welded between a top of said base plate and a bottom of said panel receiver, wherein said plurality of gussets are used to orient said panel receiver at a specific angle.

5. The ISO container structure of claim 1 wherein:
   each panel pocket includes a base receiver member, a first angled receiver side member, a second angled receiver side member and a receiver flange member, said first angled receiver side member extends upward from a first end of said base receiver member, said second angled receiver side member extends upward from a second end of said base receiver member, said receiver flange member extends from a distal end of said first angled receiver side member.

6. The ISO container structure of claim 1, further comprising:
   a plurality of fasteners for securing said plurality of arch panels to each other, a plurality of threaded rods are engaged with said plurality of fasteners using a plurality of nut couplers, at least one of a support bar and a conduit hanger may be suspended from at least one of said plurality of threaded rods.

7. An ISO container structure comprising:
   at least one first ISO container block and at least one second ISO container block, each said ISO container block includes a lower ISO container and an upper ISO container secured to said lower ISO container, a first rear ISO block and a second rear ISO block, said first rear ISO block is retained behind said first ISO block, said second rear ISO block is retained behind said second ISO block, said rear end wall is attached to said first and second rear ISO blocks;
   a first side wall is retained between said first ISO block and said first rear ISO block, a second side wall is retained between said second ISO block and said second rear ISO block;
   a modular roof includes a plurality of arch panels and a plurality of arch connectors, each one of said plurality of arch panels includes a first panel side, a second panel side, a first panel end and a second panel end, said panel sides and said panel ends of said plurality of arch panels are removably attached to each other to form a modular roof panel, each one of said plurality arch connectors includes a plurality of panel pockets, each one of said plurality of panel pockets is sized to receive a cross section of one of said plurality of arch panels, each end of said modular roof panel is removably attached to said plurality of arch connectors, said plurality of arch connectors are attached to a top of said upper ISO container block; and
   a front end wall and a rear end wall, a first end of said front end wall is attached to a front of said first ISO container block, a second end of said front end wall is attached to a front of said second ISO container, a first end of said rear end wall is attached to a rear of said first ISO container block, a second end of said rear end wall is attached to a rear of said second ISO container.

8. The ISO container structure of claim 7, further comprising:

a plurality of twist lock connectors are used to removably secure said upper ISO container to said lower ISO container.

9. The ISO container structure of claim 7, further comprising:
a plurality of upper attachment brackets are attached to said upper ISO container, a plurality of lower attachment brackets are attached to said lower ISO container, wherein one of a plurality of container bridge fittings and a plurality of fasteners are used draw said upper attachment bracket toward said lower attachment bracket.

10. The ISO container structure of claim 7 wherein:
each one of said plurality of arch panels includes a base member, a first angled side member, a second angled side member, a first flange and a second flange, said first angled side member extends upward from a first side of said base member, said second angled side member extends upward from a second side of said base member, said first flange extends outward from a distal edge of said first angled side member, said second flange extends outward from a distal edge of said second angled side member.

11. The ISO container structure of claim 7 wherein:
each one of said plurality of arch connectors includes a base plate, a panel receiver and a plurality of gussets, said plurality of gussets are welded between a top of said base plate and a bottom of said panel receiver, wherein said plurality of gussets are used to orient said panel receiver at a specific angle.

12. The ISO container structure of claim 7 wherein:
each panel pocket includes a base receiver member, a first angled receiver side member, a second angled receiver side member and a receiver flange member, said first angled receiver side member extends upward from a first end of said base receiver member, said second angled receiver side member extends upward from a second end of said base receiver member, said receiver flange member extends from a distal end of said first angled receiver side member.

13. The ISO container structure of claim 7, further comprising:
a plurality of fasteners for securing said plurality of arch panels to each other, a plurality of threaded rods are engaged with said plurality of fasteners using a plurality of nut couplers, at least one of a support bar and a conduit hanger may be suspended from at least one of said plurality of threaded rods.

14. The ISO container structure of claim 7, further comprising:
a gutter includes a modular roof flange, a gutter channel and a plurality of gutter hangers, said modular roof flange extends outward from one edge of said gutter channel, a retention lip is formed on an opposing edge of said gutter channel, said plurality of gutter hangers are retained between said modular roof flange and said plurality of arch panels, the other end of said plurality of gutter hangers are engaged with said retention lip.

15. An ISO container structure comprising:
at least one first ISO container block and at least one second ISO container block, each said ISO container block includes a lower ISO container and an upper ISO container secured to said lower ISO container; and
a modular roof includes a plurality of arch panels and a plurality of arch connectors, each one of said plurality of arch panels includes a first panel side, a second panel side, a first panel end and a second panel end, said panel sides and said panel ends of said plurality of arch panels are removably attached to each other to form a modular roof panel, each one of said plurality of arch connectors includes a plurality of panel pockets, each one of said plurality of panel pockets is sized to receive a cross section of one of said plurality of arch panels, each end of said modular roof panel is removably attached to said plurality of arch connectors, said plurality of arch connectors are attached to a top of said upper ISO container block; and
a gutter includes a modular roof flange, a gutter channel and a plurality of gutter hangers, said modular roof flange extends outward from one edge of said gutter channel, a retention lip is formed on an opposing edge of said gutter channel, said plurality of gutter hangers are retained between said modular roof flange and said plurality of arch panels, the other end of said plurality of gutter hangers are engaged with said retention lip.

16. The ISO container structure of claim 15 wherein:
each one of said plurality of arch panels includes a base member, a first angled side member, a second angled side member, a first flange and a second flange, said first angled side member extends upward from a first side of said base member, said second angled side member extends upward from a second side of said base member, said first flange extends outward from a distal edge of said first angled side member, said second flange extends outward from a distal edge of said second angled side member.

17. The ISO container structure of claim 15 wherein:
each one of said plurality of arch connectors includes a base plate, a panel receiver and a plurality of gussets, said plurality of gussets are welded between a top of said base plate and a bottom of said panel receiver, wherein said plurality of gussets are used to orient said panel receiver at a specific angle.

18. The ISO container structure of claim 15 wherein:
each panel pocket includes a base receiver member, a first angled receiver side member, a second angled receiver side member and a receiver flange member, said first angled receiver side member extends upward from a first end of said base receiver member, said second angled receiver side member extends upward from a second end of said base receiver member, said receiver flange member extends from a distal end of said first angled receiver side member.

19. The ISO container structure of claim 15, further comprising:
a plurality of fasteners for securing said plurality of arch panels to each other, a plurality of threaded rods are engaged with said plurality of fasteners using a plurality of nut couplers, at least one of a support bar and a conduit hanger may be suspended from at least one of said plurality of threaded rods.

* * * * *